United States Patent [19]

Wiseman, Sr.

[11] Patent Number: 6,099,946
[45] Date of Patent: Aug. 8, 2000

[54] HIGH PRESSURE WATER JET PROTECTION

[75] Inventor: Timothy R. Wiseman, Sr., Richmond, Va.

[73] Assignee: E. I. du Pont de Nemours and Company, Wilmington, Del.

[21] Appl. No.: 09/188,792

[22] Filed: Nov. 9, 1998

Related U.S. Application Data

[60] Provisional application No. 60/065,343, Nov. 12, 1997, abandoned.

[51] Int. Cl.⁷ ....................................................... B32B 25/02
[52] U.S. Cl. ......................... 428/212; 442/247; 442/251; 442/253; 442/280; 442/281; 428/219
[58] Field of Search ..................................... 442/247, 251, 442/253, 280, 281; 428/212, 219

[56] References Cited

U.S. PATENT DOCUMENTS

| 5,014,357 | 5/1991 | Wiseman, Sr. | 2/81 |
| 5,268,218 | 12/1993 | Zafiroglu | 428/219 |
| 5,565,264 | 10/1996 | Howland | 428/229 |

FOREIGN PATENT DOCUMENTS

| WO 94/19523 | 9/1994 | WIPO | D04H 1/74 |
| WO 96/35578 | 11/1996 | WIPO | B32B 3/00 |

*Primary Examiner*—Christopher Raimund

[57] ABSTRACT

A two-structure composite for protection from high velocity water jets is provided and includes one structure of tightly woven aramid yarns impregnated by a resin matrix and one structure of nonwoven, bulked, material.

3 Claims, No Drawings

HIGH PRESSURE WATER JET PROTECTION

Applicant claims the benefit of priority to provisional application Ser. No. 60/065,343 filed Nov. 12, 1997, abandoned.

BACKGROUND OF THE INVENTION

1. Field of the Invention

This invention relates to a structure which is relatively light weight and flexible and, at the same time, provides protection from very high velocity water jets.

2. Description of the Prior Art

U.S. Pat. No. 5,014,357, issued May 14, 1991 on the application of the inventor herein, describes a protective garment which is useful against high pressure steam. The protection afforded is specific to steam and is very different from the requirements for protection from water jets.

U.S. Pat. No. 5,565,264, issued Oct. 15, 1996 on the application of Charles A. Howland, describes a protective garment with high resistance to penetration by knives and ballistic threats.

International Publication Number WO 96/35578, published Nov. 14, 1996 discloses a composite sheet constructed of resin impregnated nonwoven sheet material to provide protection from abrasion.

SUMMARY OF THE INVENTION

A fabric composite is disclosed which is particularly suited for protection against high velocity jets of water, comprising an outer structure and an inner structure wherein the outer structure includes at least one layer of tightly woven, continuous filament, aramid yarns, said at least one layer impregnated by 5 to 40 percent of a polymer matrix material, based on the weight of the layer, and weighing at least 250 g/m$^2$; and the inner structure includes at least one layer of nonwoven bulked, material, said at least one layer impregnated by 25 to 50 percent of a polymer matrix material, based on the weight of the layer, and weighing at least 650 g/m$^2$. This fabric composite may have outer structures on both sides of the inner structure to make a sort of sandwich construction.

DETAILED DESCRIPTION

High velocity water jets are commonly used for industrial cleaning applications. Removal of paint and other coatings and contamination from masonry, steel, and concrete surfaces often involves hand-held high velocity water jets. Water jets are the tool of choice for removal of rust and scale from bridges, ships, heat exchange tubes, and the like.

High velocity water jets, while very effective in cleaning applications, are extremely dangerous. Such jets are usually hand-held and the operators have often, in the past, been entirely unprotected. One pass of a jet across an unprotected limb can easily peel flesh and break bones. In even a minor water jet contact, the water can be forced directly through skin into flesh to cause serious and persistent infection. Clothing and shoes or boots of a customary industrial working grade are quickly shredded by these water jets.

This invention is primarily directed toward fabric composites which provide protection from the ravages of exposure to high velocity water jets. The fabric composites of this invention are made using a combination of two different structures—an outer structure which forms the strike face for the water jet threat, and an inner structure which provides resistance to deformation. It is believed that the outer structure provides initial resistance to the cutting action of a water jet by diffusing the jet, itself; and the inner structure provides a dissipation of energy from the jet over a broadened area with minor deformation of the composite. While the fabric composite of this invention can be made by placing the two structures in a variety of ways, it is important that the outer structure be placed to form the strike face for the composite. It is not unusual for the composite to have two or three layers one or two inner structure layers and one outer structure layer to serve as the strike face for the water jet threat. Additional layers can be provided. Additional inner structure layers can be used although such layers greatly increase the stiffness of the composite. As a general rule, it has been found that the total weight of the inner structure layers should be at least 650 g/m$^2$. Additional outer structure layers can be used at the strike face side of the composite, if desired, however it has been found that the total weight of the outer structure layers is adequate if at least 250 g/m$^2$. If desired or required for the sake of comfort or aesthetics, the inner structure layers can be sandwiched between outer structure layers, provided that the outer structure layers on the strike face side, nevertheless, weigh at least 250 g/m$^2$. Of course, the degree of protection is controlled by the number of layers in the composite.

The outer structure is a tightly woven para-aramid fabric having a resin matrix which at least partially impregnates the para-aramid yarns of the fabric. By "para-aramid" is meant poly(p-phenylene terephthalamide) homopolymer of p-phenylene diamine and terephthaloyl chloride and copolymers having minor amounts of other diamines or diacid chlorides so long as the other diamines and diacid chlorides do not overly alter the required qualities of the para-aramid. The fabric of the outer structure is woven to a tightness factor of at least 96 percent using continuous filament yarn of 100 to 3000 dtex linear density. It is believed that yarn of at least 100 dtex is necessary to achieve adequate protection and that yarn of greater than 3000 dtex is too large and stiff to be easily woven into a usable fabric.

The resin matrix in the outer structure is believed to be necessary to prevent or slow the separation of individual yarns by the force of a water jet. To be effective, the resin must exhibit adequate strength and must be at least partially impregnated into the yarns of the fabric. The resin matrix can be formed by having one resin impregnating the fabric and serving, in addition, as an adhesive holding a resin film on the fabric. Resin adhesives and films which are suitable include polyurethanes, epoxies, rubbers such as neoprene, polyesters, polyacrylates, polyethers, polyamides, mixtures thereof, and the like. The resins may be thermoplastic or thermosetting and can be elastomeric. The outer structure includes 5 to 40 percent resin based on the weight of the outer structure and the resin should impregnate the fabric at least to an extent adequate to hold individual yarns in position relative to other yarns in the fabric. It is preferable that the resin be uniformly distributed throughout the fabric or that it be concentrated at the water jet strike surface; and, when the outer structure includes a resin film, the film should be directed toward the water jet threat.

Fabric tightness factor is determined and calculated as described in *Research Disclosure*, October 1988, Publication Item No. 29498, "Calculation of Fabric Tightness Factor," pp. 833–6. In determining fabric tightness, the linear density of a yarn is determined by removing the yarn from the fabric, hand-extending the yarn to obtain a length of yarn without weave crimp, and then weighing that length to determine its approximate dtex. The yarn is then loaded to 0.11 g/dtex and the length is remeasured. The remeasured length is used, together with the weight of that length of yarn, to calculate the dtex used in the formula for fabric tightness.

The inner structure is a nonwoven, bulked, sheet material of high abrasion resistance. The inner structure has a construction as generally taught in aforementioned International Publication Number WO 96/35578 (corresponding to U.S. application Ser. No. 08/330,886, filed Oct. 28, 1994, now abandoned). The structure includes a fabric of two closely intermingled fiber components and a resin matrix component. One of the two intermingled fiber components is a nonwoven substrate of textile fibers, such as polyesters, polyamides, and the like. The other fiber component is a heat-contractible yarn which can be polyesters, polyamides and the like. In construction of the inner structure, the contractible yarn and the nonwoven substrate of fibers are combined together, before the heat-contractible yarn is contracted, by being knitted or woven into the same fabric or by being stitch bonded or hydrolaced together. The fabric is then subjected to heat to contract the heat-contractible yarn and the contraction causes shrinkage and bulking of the overall fabric dimension and buckling to form pile-like loops. The resulting, bulked, fabric of buckled and looped heat-contracted yarn is impregnated by a matrix resin and serves as the inner structure of the composite of this invention. Details of the structure and processes for making the structure are contained in the aforementioned International Publication Number WO 96/35578 and its corresponding U.S. application, incorporated herein by reference.

In the preferred form of this invention, the inner structure layers are made from two intermingled fiber components of polyester. One of the two intermingled fiber components is a nonwoven substrate made from polyester staple fiber; and the other component is a heat-contractible polyester yarn. Once made, the inner structure layers are stabilized and heat set and are then coated or impregnated with a matrix resin such as a polyurethane resin. The final thickness of the inner structure layers are set by heating and pressing to the desired thickness.

Various types of resins are suitable for impregnating the inner structure. Particularly useful polymeric resins include polyurethanes, epoxies, synthetic rubbers, polyesters, polyacrylates, polyethers, polyamides, mixtures thereof, and the like. While it is preferred that the resins be flexible, very soft resins, for example soft rubber latexes or resins that are highly foamed, generally are not suitable. Resins suitable for use in this invention adhere well to the fibers and usually are well distributed throughout the fabric layer. Polyurethane resin is the preferred matrix resin for use in the inner structure of this invention.

The outer and inner structures of the composite of this invention are stacked. In a preferred combination, adjacent, stacked, layers of the structures are joined only at the periphery or are tacked together at widely spaced-apart intervals. While it is believed that the composite will function effectively when faces of the adjacent structures are closely adhered or stitched together, it is preferred that the adjacent structures should be only loosely joined so as to provide the individual structures with a freedom of independent movement. Such freedom improves effectiveness of the protection against water jet damage and increases flexibility of the composite.

The composites of this invention find use as water jet protection in the form of garments such as gloves, aprons, spats, suits, quilts, and the like.

TEST METHODS

Degree of protection from water jet damage is measured by exposing sample composites to the forces of a high pressure water jet under controlled conditions.

The composite to be tested is clamped in place against a flat steel support and a test nozzle is mounted on a track which permits the head of the nozzle to travel past the composite at a "swipe speed" of 1.2 to 1.8 meters/second and a "stand-off" of 10 centimeters. The "swipe speed" is velocity of the nozzle relative to the test composite and the "stand-off" is the distance from the nozzle to the test composite.

In the tests described herein, two different nozzles were used. Both were obtained from National Liquid Blasters Corporation, Detroit, Mich., USA. The nozzle Number 35 had a zero degree exit and delivered 18.8 liters of water per minute at 248 MPa and 17.1 liters per minute at 207 Mpa. The nozzle identified as Number 25 had dual exits at 20 degrees from the axis and delivered a total of 9.59 liters of water per minute at 248 Mpa and 8.75 liters per minute at 207 Mpa. The jets of nozzle Number 25 were rotated at 3000 rpm by external (air pressure) forces.

EXAMPLES

Example 1

A fabric composite was made by placing one outer structure layer on each side of two inner structure layers to yield a four layer composite construction of outer/inner/inner/outer structures. The outer structure layer was a plain weave fabric woven from yarns of 1100 dtex continuous filament poly(p-phenylene terephthalamide) sold under the tradename of Kevlar® 29 by E. I. du Pont de Nemours and Company. The fabric tightness was 100 percent.

Although not necessary or required for practice of this invention, the outer structure of this Example had an alumunized polyester film coating and the matrix resin was the adhesive used to attach this coating to the fabric. The matrix resin was a neoprene-based adhesive coated onto and impregnating the fabric.

The outer structure weighed 350 g/m$^2$ and was 22 percent resin matrix based on the total weight of the structure.

The inner structure was a resin-impregnated, nonwoven, fabric. The inner structure fabric was a nonwoven polyester fabric available from E. I. du Pont de Nemours and Company under the tradename XYMID® and characterized as Style 1870, in turn, made from a substrate of 40 g/m$^2$ spunlaced nonwoven fabric available from E. I. du Pont de Nemours and Company and known by the tradename SONTARA®, Style 8000 made using polyester staple fiber. The substrate was stitched, as disclosed in the process of WO 96/35578, with a heat-contractible polyester yarn to form a fabric with a weight of 460 g/m$^2$. The stitched fabric was then exposed to boiling water to contract the polyester yarns and shrink and bulk the fabric resulting in a fabric having a weight of 540 g/m$^2$. The fabric was then placed on a tenter frame and stretched and heat set to 460 g/m$^2$, after which it was coated and impregnated with a polyurethane resin in a knife over roll coating process, supplying 405 g/m$^2$ of the polyurethane resin to the fabric. The polyurethane resin was obtained from B. F. Goodrich and identified as "12992". The coated fabric was then dried to remove volatile materials leaving a resin matrix within the fabric reinforcement. The coated fabric was then heated to establish complete consolidation of the structure and establish a weight of 850 g/m$^2$ with a thickness of 0.9 millimeter.

The outer structure layers and the inner structure layers were assembled by stitching at the periphery and were tested as described above. No water penetration of this fabric composite was observed.

Example 2

Three fabric composites were tested to determine the need for an impregnated polymer matrix on the outer structure layer. In each case, the fabric to be impregnated was a 270 g/m² plain weave fabric made from 1100 dtex para-aramid continuous filament yarns. Fabric A was a duplicate of the outer structure of Example 1. Fabric A had an aluminized polyester film coating attached to the fabric by an impregnated neoprene adhesive. Fabric B was the aramid fabric from Example 1 with two thin coats of a neoprene coating having a low enough viscosity so as to have the coating impregnate the fibers. Fabric B was about 20 weight percent matrix resin. Fabric C was the aramid fabric from Example 1 without any impregnating matrix resin.

Four-layer constructions were made from two layers of these outer structures, between which was inserted two layers of the inner structure from Example 1. The resulting composites were tested by exposing the composites to water jets of 17.1 liters per minute at 248 Mpa at a stand-off of 10 centimeter and a swipe speed of 1.2 to 1.8 meters per second.

The outer structure layer furthest from the water jet exhibited: (a) no damage in the composite containing Fabric A; (b) minimal, but acceptable, damage in the composite containing Fabric B; and (c) substantial, unacceptable, damage in the composite containing Fabric C.

What is claimed is:

1. A fabric composite particularly suited for protection against high velocity jets of water, comprising an outer structure and an inner structure wherein:

a) the outer structure includes at least one layer of tightly woven, continuous filament, aramid yarns, said at least one layer impregnated by 5 to 40 percent of a polymer matrix material, based on the weight of the layer, and weighing at least 250 g/m²; and b) the inner structure includes at least one layer of nonwoven, bulked, material, said at least one layer impregnated by 25 to 50 weight percent of a polymer matrix material, based on the weight of the layer, and weighing at least 650 g/m².

2. The fabric of claim 1 wherein the composite includes an outer structure on both sides of the inner structure.

3. A garment made from the fabric of claim 1.

* * * * *